United States Patent
Shao et al.

(10) Patent No.: US 12,241,769 B2
(45) Date of Patent: *Mar. 4, 2025

(54) METHOD AND SYSTEM FOR DETERMINING ABNORMAL DEVICE IN PROCESS OF MEASURING ENERGY OF NATURAL GAS BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Xiaojun Wei, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,569

(22) Filed: Aug. 24, 2023

(65) Prior Publication Data
US 2023/0400341 A1 Dec. 14, 2023

Related U.S. Application Data

(63) Continuation of application No. 17/649,345, filed on Jan. 28, 2022, now Pat. No. 11,796,368.

(30) Foreign Application Priority Data

Feb. 4, 2021 (CN) .......................... 202110155152.9
Jan. 14, 2022 (CN) .......................... 202210043885.8

(51) Int. Cl.
*G01F 15/063* (2022.01)
*G01F 15/075* (2006.01)
(Continued)

(52) U.S. Cl.
CPC .......... *G01F 15/063* (2013.01); *G01F 15/075* (2013.01); *G16Y 20/30* (2020.01); *G16Y 40/10* (2020.01); *H04L 67/12* (2013.01)

(58) Field of Classification Search
CPC ..... G01F 15/063; G01F 15/075; G16Y 40/10; G16Y 20/30; H04L 67/12; G01D 4/002;
(Continued)

(56) References Cited

U.S. PATENT DOCUMENTS 8,701,209 B2 * 4/2014 Awata .................. H04L 9/3213
726/30
9,204,208 B2 12/2015 Hurri et al.
(Continued)

FOREIGN PATENT DOCUMENTS

CN 103542904 A 1/2014
CN 105807027 A 7/2016
(Continued)

OTHER PUBLICATIONS

Xu, Xiaoxuan et al., An Energy Measurement Method for Multi-source Natural Gas Distribution Pipeline Networks, Natural Gas Industry, 38(1): 116-122, 2018.
(Continued)

*Primary Examiner* — Franklin D Balseca
(74) *Attorney, Agent, or Firm* — PORUS IP LLC

(57) ABSTRACT

The present disclosure discloses a method for determining an abnormal device in a process of measuring energy of natural gas based on Internet of Things (IOT). The method may include obtaining a natural gas detection parameter detected by at least one detection device via a sense network platform in response to a query request; determining first energy data and second energy data by processing the natural gas detection parameter; determining whether the abnormal device exists by comparing the first energy data
(Continued)

and the second energy data; in response to determining that the abnormal device exists, for each detection device, determining a probability that the detection device is abnormal based on related information of the detection device, the first energy data, and the second energy data; and determining the abnormal device based on the probability that the detection device is abnormal.

20 Claims, 6 Drawing Sheets

(51) Int. Cl.
  *G16Y 20/30* (2020.01)
  *G16Y 40/10* (2020.01)
  *H04L 67/12* (2022.01)
(58) Field of Classification Search
  CPC .... G01D 4/004; G01D 4/008; H04Q 2209/00; H04Q 2209/10; H04Q 2209/40; H04Q 2209/60; H04Q 2209/70; H04Q 2209/75; H04Q 9/00
  See application file for complete search history.

(56) References Cited

U.S. PATENT DOCUMENTS

| | | | |
|---|---|---|---|
| 10,641,619 | B1 | 5/2020 | Shao |
| 11,796,368 | B2* | 10/2023 | Shao ................. G16Y 20/30 |
| 2010/0218108 | A1 | 8/2010 | Crabtree et al. |
| 2014/0351187 | A1 | 11/2014 | Halim et al. |
| 2015/0346007 | A1 | 12/2015 | James et al. |
| 2018/0191867 | A1 | 7/2018 | Siebel et al. |
| 2019/0089788 | A1* | 3/2019 | Shao ................. H04L 67/125 |
| 2019/0273784 | A1 | 9/2019 | Shao |
| 2020/0204577 | A1 | 6/2020 | Song et al. |
| 2022/0163365 | A1 | 5/2022 | Shao et al. |
| 2022/0170774 | A1* | 6/2022 | Lampe-Juergens .... G01D 4/004 |

FOREIGN PATENT DOCUMENTS

| | | |
|---|---|---|
| CN | 109214920 A | 1/2019 |
| CN | 111486930 A | 8/2020 |
| CN | 112946231 A | 6/2021 |
| CN | 113298127 A | 8/2021 |
| CN | 113778802 A | 12/2021 |
| WO | 2016026171 A1 | 2/2016 |

OTHER PUBLICATIONS

Feng, Lu et al., An Analytical Study Based on the Management of Natural Gas Metering in China, Modern Economic Information, 2015, 2 pages.

Shao, Zehua, Exploration and Research of IoT Architecture, Internet of Things Technologies, 2015, 30 pages.

Shao, Zehua, Smart City Architecture, Internet of Things Technologies, 2016, 18 pages.

* cited by examiner

METHOD AND SYSTEM FOR DETERMINING ABNORMAL DEVICE IN PROCESS OF MEASURING ENERGY OF NATURAL GAS BASED ON INTERNET OF THINGS

CROSS-REFERENCE TO RELATED APPLICATIONS

This application is a continuation of U.S. patent application Ser. No. 17/649,345, filed on Jan. 28, 2022, which claims priority to Chinese Patent Application No. 202110155152.9, filed on Feb. 4, 2021, and Chinese Patent Application No. 202210043885.8, filed on Jan. 14, 2022, the contents of each of which are incorporated herein by reference in their entirety.

TECHNICAL FIELD

The present disclosure relates to natural gas metering field, in particular, to a method and a system for determining an abnormal device in a process of measuring energy of natural gas based on Internet of Things.

BACKGROUND

With development of science and technology, gas industry has been promoted to develop in a direction of digitization, networking, automation, integration and low energy consumption. Compared with traditional energy, a demand for natural gas in the field of urban gas and transportation will maintain a high-speed growth trend. With increasingly complex customer groups faced by gas companies, the gas application scenarios are more and more diversified, which put forward higher requirements for the accuracy and stability of gas measurement.

Therefore, it is necessary to provide a method for determining an abnormal device in a process of measuring energy of natural gas based on the Internet of Things (IOT), and implement real-time control of the natural gas metering process to face diverse natural gas metering needs.

SUMMARY

One aspect of the present disclosure may provide a method for determining an abnormal device in a process of measuring energy of natural gas based on Internet of Things (IOT). The method may be performed by a management platform. The method may include: in response to a query request received by a user platform, obtaining a natural gas detection parameter detected by at least one detection device of a sense control platform via a sense network platform; determining first energy data and second energy data by processing the natural gas detection parameter; determining whether the abnormal device exists by comparing the first energy data and the second energy data; in response to determining that the abnormal device exists, for each detection device of the at least one detection device for detecting the natural gas detection parameter, determining a probability that the detection device is abnormal based on related information of the detection device, the first energy data, and the second energy data; and determining the abnormal device based on the probability that the detection device is abnormal.

In some embodiments, the sense control platform may include at least one first detection device at a pipe network end, the natural gas detection parameter may include at least one first detection parameter detected by the at least one first detection device, and the determining the first energy data by processing the natural gas detection parameter may include: determining the first energy data by processing the first detection parameter based on a predetermined algorithm.

In some embodiments, the sense control platform may include at least one second detection device at a user end, the natural gas detection parameter may include at least one second detection parameter detected by the at least one second detection device, and the determining the second energy data by processing the natural gas detection parameter may include: determining the second energy data by processing the at least one second detection parameter based on a prediction model, wherein the prediction model is a machine learning model.

In some embodiments, the at least one second detection parameter may include natural gas temperature, natural gas pressure, natural gas components, and natural gas density, and the determining the second energy data by processing the at least one second detection parameter based on a prediction model may include: determining the second energy data by processing at least one of the natural gas temperature, the natural gas pressure, the natural gas components, or the natural gas density based on the prediction model.

In some embodiments, the method may further include generating natural gas metering data based on the first energy data and the second energy data; and transmitting the natural gas metering data to the user platform via a service platform.

In some embodiments, the natural gas metering data may include at least one of energy data or volume data, and the transmitting the natural gas metering data to the user platform via a service platform may include: transmitting the at least one of the energy data or the volume data to the user platform via the service platform according to a type of the query request.

In some embodiments, the method may further include: determining the volume data by processing the natural gas detection parameter based on a predetermined algorithm $V_n = V_t \times P_t/P_n \times (273.15+T_n)/(273.15+T_t) \times F_z^2$. $F_z = \sqrt{Z_n/Z_t}$ is a super compression factor, $Z_n$ is a natural gas compression factor in the standard state, $Z_t$ is a natural gas compression factor obtained by the at least one detection device, $V_n$ is a natural gas flow in the standard state, $V_t$ is a natural gas flow obtained by the at least one detection device, $P_n$ is the natural gas pressure intensity under the standard state, $P_t$ is a natural gas pressure obtained by the at least one detection device, $T_n$ is a natural gas temperature under standard state, and $T_t$ is a natural gas temperature obtained by the at least one detection device.

In some embodiments, the method may further include determining the energy data by processing the natural gas detection parameter based on a predetermined algorithm $E = (\tilde{H}[t_1, V(t_2,p_2)] \times V_n)$. E is energy generated by the complete combustion of natural gas in the standard state, $\tilde{H}[t_1, V(t_2,p_2)]$ is a real volume calorific value of natural gas, $V_n$ is a natural gas flow under the standard state, $t_1$ is a temperature of combustion reference condition, $t_2$ is a temperature of meter reference condition, $p_2$ is a pressure.

In some embodiments, the determining a probability that the detection device is abnormal based on related information of the detection device, the first energy data, and the second energy data may include: determining the probability that the detection device is abnormal by processing the related information of the detection device, the first energy data, and the second energy data based on an abnormality determination model. The abnormality determination model may be a machine learning model.

Another aspect of the present disclosure may provide a system for determining an abnormal device in a process of measuring energy of natural gas based on Internet of Things (IOT). The system may include at least one storage device including a set of instructions; and at least one processor configured to communicate with the at least one storage device, wherein when executing the set of instructions, the at least one processor is configured to direct the system to perform operations. The operations may include in response to a query request received by a user platform, obtaining a natural gas detection parameter detected by at least one detection device of a sense control platform via a sense network platform; determining first energy data and second energy data by processing the natural gas detection parameter; determining whether the abnormal device exists by comparing the first energy data and the second energy data; in response to determining that the abnormal device exists, for each detection device of the at least one detection device for detecting the natural gas detection parameter, determining a probability that the detection device is abnormal based on related information of the detection device, the first energy data, and the second energy data; and determining the abnormal device based on the probability that the detection device is abnormal.

In some embodiments, the sense control platform may include at least one first detection device at a pipe network end, the natural gas detection parameter may include at least one first detection parameter detected by the at least one first detection device, and to determine the first energy data by processing the natural gas detection parameter, the at least one processor may be configured to direct the system to perform operations including: determining the first energy data by processing the first detection parameter based on a predetermined algorithm.

In some embodiments, the sense control platform may include at least one second detection device at a user end, the natural gas detection parameter may include at least one second detection parameter detected by the at least one second detection device, and to determine the second energy data by processing the natural gas detection parameter, the at least one processor may be configured to direct the system to perform operations including: determining the second energy data by processing the at least one second detection parameter based on a prediction model, wherein the prediction model is a machine learning model.

In some embodiments, the at least one processor may further be configured to direct the system to perform operations including: generating natural gas metering data based on the first energy data and the second energy data; and transmitting the natural gas metering data to the user platform via a service platform.

In some embodiments, the natural gas metering data may include at least one of energy data or volume data, and to transmitting the natural gas metering data to the user platform via a service platform, the at least one processor may be configured to direct the system to perform operations including: transmitting the at least one of the energy data or the volume data to the user platform via the service platform according to a type of the query request.

In some embodiments, to determining a probability that the detection device is abnormal, the at least one processor may be configured to direct the system to perform operations including: determining the probability that the detection device is abnormal by processing the related information of the detection device, the first energy data, and the second energy data based on an abnormality determination model, wherein the abnormality determination model is a machine learning model.

Another aspect of the present disclosure may provide a non-transitory computer-readable medium. The non-transitory computer-readable medium may include at least one set of instructions. When the at least one set of instructions are executed by at least one processor of a computer device, the at least one set of instructions may direct the at least one processor to perform operations including: in response to a query request received by a user platform, obtaining a natural gas detection parameter detected by at least one detection device of a sense control platform via a sense network platform; determining first energy data and second energy data by processing the natural gas detection parameter; determining whether the abnormal device exists by comparing the first energy data and the second energy data; in response to determining that the abnormal device exists, for each detection device of the at least one detection device for detecting the natural gas detection parameter, determining a probability that the detection device is abnormal based on related information of the detection device, the first energy data, and the second energy data; and determining the abnormal device based on the probability that the detection device is abnormal.

In some embodiments, the sense control platform may include at least one first detection device at a pipe network end, the natural gas detection parameter may include at least one first detection parameter detected by the at least one first detection device, and to determining the first energy data by processing the natural gas detection parameter, the at least one set of instructions may direct the at least one processor to perform operations including: determining the first energy data by processing the first detection parameter based on a predetermined algorithm.

In some embodiments, the sense control platform may include at least one second detection device at a user end, the natural gas detection parameter may include at least one second detection parameter detected by the at least one second detection device, and to determine the second energy data by processing the natural gas detection parameter, the at least one set of instructions may direct the at least one processor to perform operations including: determining the second energy data by processing the at least one second detection parameter based on a prediction model, wherein the prediction model is a machine learning model.

In some embodiments, the at least one set of instructions may further direct the at least one processor to perform operations including: generating natural gas metering data based on the first energy data and the second energy data; and transmitting the natural gas metering data to the user platform via a service platform.

In some embodiments, the natural gas metering data may include at least one of energy data or volume data, and to transmitting the natural gas metering data to the user platform via a service platform, the at least one set of instructions may direct the at least one processor to perform operations including: transmitting the at least one of the energy data or the volume data to the user platform via the service platform according to a type of the query request.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
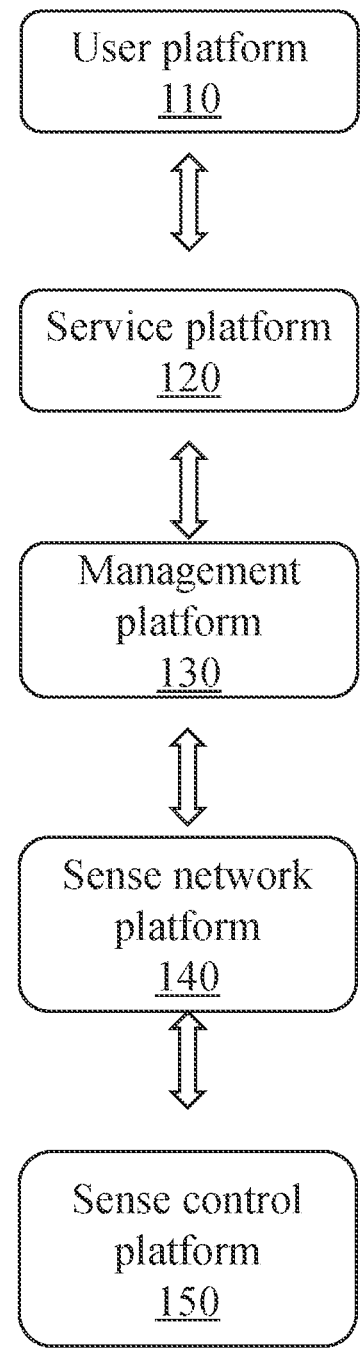
FIG. 1 is a schematic diagram illustrating an exemplary application scenario of Internet of Things system 100 for measuring energy of natural gas according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "engine," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary application scenario of Internet of Things (IOT) system 100 for measuring energy of natural gas according to some embodiments of the present disclosure.

As shown in FIG. 1, the IOT system 100 for measuring energy of natural gas may include a user platform 110, a service platform 120, a management platform 130, a sense network platform 140, a sense control platform 150.

In some embodiments, the IOT system 100 for measuring energy of natural gas may performing an operation for measuring and managing energy of natural gas by implementing the methods and/or processes disclosed in the present disclosure.

The user platform 110 may be a management system or platform of a gas supply pipe network. The gas supply pipe network may be a gas supply network used by a natural gas pipe network company to provide natural gas. The gas supply pipe network may transport natural gas from a gas supply node (such as gas supply station) to a gas consumption terminal (such as a factory, a residence, etc.) that needs natural gas. In some embodiments, the user platform 110 may exchange information and/or data with a pipe network back end of the gas supply pipe network (e.g., a pipe network user, a pipe network center, etc.). For example, the user platform 110 may be used to receive a query request input by the pipe network user (e.g., a query request about natural gas consumption). For example, the user platform 110 may receive a query request input by the pipe network center (e.g., a query request about energy data of natural gas). In some embodiments, the user platform 110 may exchange information and/or data with the management platform 130 in the IOT system 100 for measuring energy of natural gas via the service platform 120. For example, the user platform 110 may receive natural gas metering data determined by the management platform 130 (e.g., energy data of natural gas, etc.) determined by the management platform 130 via the service platform 120.

The service platform 120 may be used to transfer or store service information, and the service information may include information related to natural gas metering data, the query request, or the like. In some embodiments, the service platform 120 may be configured as a service information sensor. In some embodiments, the service platform 120 may classify and extract information and/or data of each component in the IOT system 100, and provide necessary information and/or data for the IOT system 100. In some embodiments, the service platform 120 may transmit at least one of natural gas metering data (e.g., energy data or volume data) to the user platform 110 according to a type of query request. For example, when the query request is a volume data query, the service platform 120 may send volume data to the user platform 110. In some embodiments, the service platform 120 may further process stored data (e.g., data encryption, etc.). Detailed description about the service platform may refer to FIG. 4 and its related description. It should be noted that above-mentioned description of the service platform 120 may be not the content that must be implemented.

The management platform 130 may be a platform for receiving and/or processing data. In some embodiments, the management platform 130 may be configured as an energy metering management system. The management platform 130 may include at least one database (not shown in drawings) and at least one processor (not shown in drawings). The at least one database may be used to store data, instructions, and/or any other information. For example, the at least one database may store a query request pre-entered by a user. For example, the at least one database may store predetermined algorithms, prediction models, or the like. In some embodiments, the at least one database may include a large capacity memory, removable memory, or the like, or any combination thereof. The at least one processor may obtain and process data and/or information related to measuring energy of natural gas. For example, the at least one processor may obtain a natural gas detection parameter collected by the sense control platform 150, and process the natural gas detection parameter to determine natural gas metering data.

In some embodiments, in response to the query request received by the user platform 110, the at least one processor in the management platform 130 may be configured to receive the natural gas detection parameter detected by the sense control platform 150 via the sense network platform 140, process the natural gas detection parameters and determine the natural gas metering data. For example, the at least one processor may process a first detection parameter based on a predetermined algorithm to determine first energy data, and process a second detection parameter based on a prediction model to determine second energy data, and determine an abnormal device based on the first energy data and the second energy data. In some embodiments, in response to the query request received by the user platform 110, the at least one processor in the management platform 130 may be configured to send at least one of the energy data and volume data in the natural gas metering data to the user platform 110 via the service platform 120 based on a type of query request.

The sense network platform 140 may be a gateway device that transmits data and/or information. In some embodiments, the sense network platform 140 may transmit data and/or information by using a transmit technology such as ProFnet, 5G, ethernet, or the like. In some embodiments, the sense network platform 140 may provide a network and gateway for data and/or information interaction between one or more components of the IOT system 100 (e.g., the management platform 130 and the sense control platform 150). For example, in response to the query request received by the user platform 110, the sense network platform 140 may perform comprehensive, fast, safe and effective transmission on the natural gas detection parameter obtained by the sense control platform 150 to the management platform 130 for integrated calculations. In some embodiments, the sense network platform 140 may implement various protocol conversion and communication management, so that the IOT system 100 may be compatible with sensors from different manufacturers, increasing the sensor selection flexibility.

The sense control platform 150 may be used to obtain the natural gas detection parameter. In some embodiments, the sense control platform 150 may be configured as a natural gas energy metering terminal. The sense control platform 150 may obtain the natural gas detection parameter by a detection device. The detection device may be used to detect relevant parameters of natural gas (i.e., the natural gas detection parameter). In some embodiments, in response to the query request received by the user platform 110, the sense control platform 150 may obtain the natural gas detection parameter corresponding to the query request, and transmit the natural gas detection parameter to the management platform 130 via the sense network platform 140. In some embodiments, the natural gas detection parameter obtained by the sense control platform may also be processed directly from the terminal.

In some embodiments, the sense control platform 150 may be disposed on a user end and/or tube network end of the gas supply network. The user end may be a gas terminal in the gas supply network for managing the natural gas delivered to the user. For example, the user end may include smart gauges of various homes in a residential area. The pipe network end may be a critical gas supply node in the gas supply network for controlling the delivery of natural gas. For example, the pipe network end may include a gas station, an area of a region, or the like. In some implementations, it is possible to determine whether the gas supply pipe network is operating normally by data information (e.g., natural gas metering data, etc.) at the user end and the pipe network end.

Figure 2:
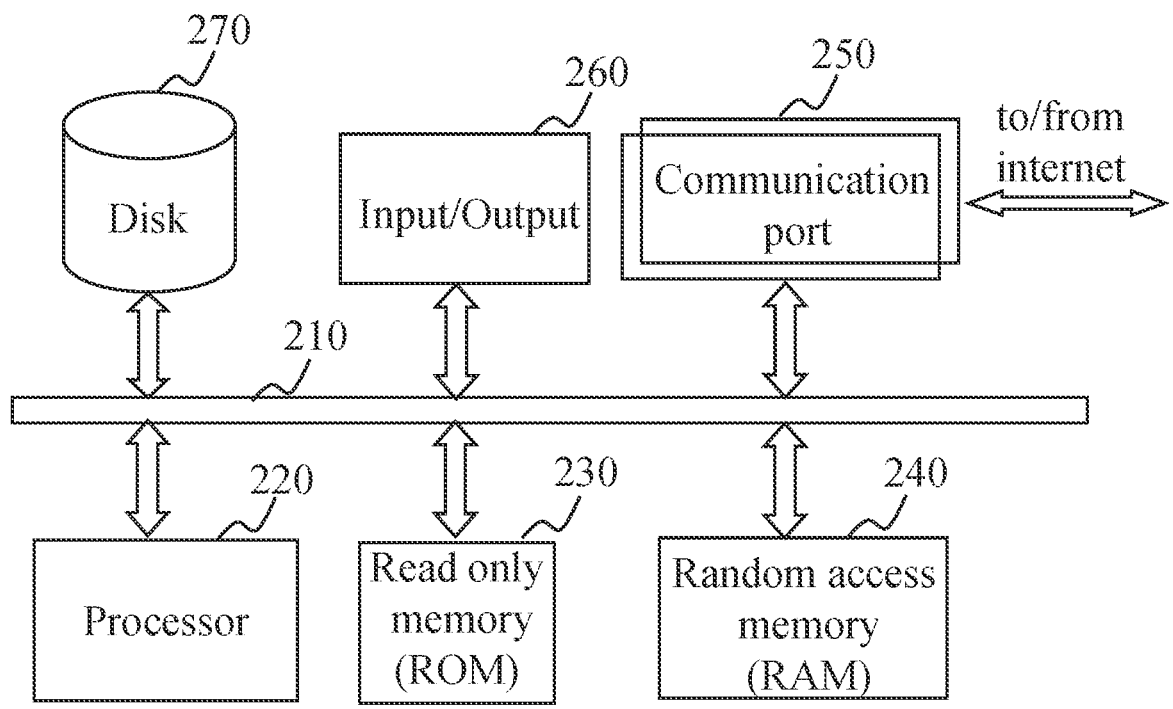
FIG. 2 is a schematic diagram illustrating exemplary hardware and software components of a computing device 200 according to some embodiments of the present disclosure.

FIG. 2 is a schematic diagram illustrating exemplary hardware and software components of a computing device 200 according to some embodiments of the present disclosure.

In some embodiments, the user platform 110, the service platform 120, the management platform 130, the sense network platform 140, and the sense control platform 150 may be implemented on the computing device 200. For example, the management platform 130 may be implemented on the computing device 200 and may be used to perform a function of a processor disclosed in the present disclosure.

The computing device 200 may be a general purpose computer or a private computer, both of which may be used to implement the IOT system 100 of the present disclosure. The computing device 200 may be used to implement any components of the IOT system 100 as described herein. For example, the processor may be implemented on computing device 200 through its hardware, software program, firmware, or a combination thereof. For convenience, only one computer is shown in drawings, but the computer function related to the energy measurement or query described in the present disclosure may be implemented in a plurality of similar platforms to disperse processing loads.

The computing device 200 may include a communication port 250 that is connected to the network and/or from the network to implement data communication. The computing device 200 may also include a processor 220 in the form of a processor, used to execute program instructions. An exemplary computer platform may include an internal communication bus 210, different types of program memory and data memory (e.g., a disk 270, a read only memory (ROM) 230 or a random access memory (RAM) 240), or various data files processed and/or transmitted by a computer. The exemplary computer platform may also include program instructions stored by processor 220 in the ROM 230, RAM 240, and/or other form of non-temporary storage medium. The methods and/or processes of the present disclosure may be implemented in a manner of program instructions. The computing device 200 may also include an input/output device 260 that allows input/output between the computer and other components. The computing device 200 may also receive programming and data via network communication.

The computing device 200 may also include a hard disk controller communicating with a hard disk, a keypad/keyboard controller communicating with a keypad/keyboard, a serial interface controller communicating with a serial interface device, a parallel interface controller communicating with a parallel interface device, a display controller communicating with a display, or any combination thereof.

For example, only a CPU and/or processor is described in the computing device 200. However, it should be noted that the computing device 200 in the present disclosure may include a plurality of CPUs and/or processors, so the operations and/or methods implemented by one CPU and/or processor described in the present disclosure may also be implemented jointly or independently by a plurality of CPUs and/or processors. For example, if in the present disclosure, the CPU and/or processor of the computing device 200 performs operation A and operation B, it should be understood that, operation A and operation B may also be performed jointly or independently by two different CPUs and/or processors in the computing device 200 (e.g., a first processor performs operation A, a second processor performs operation B, or the first and second processors jointly perform operation A and operation B).

Figure 3:
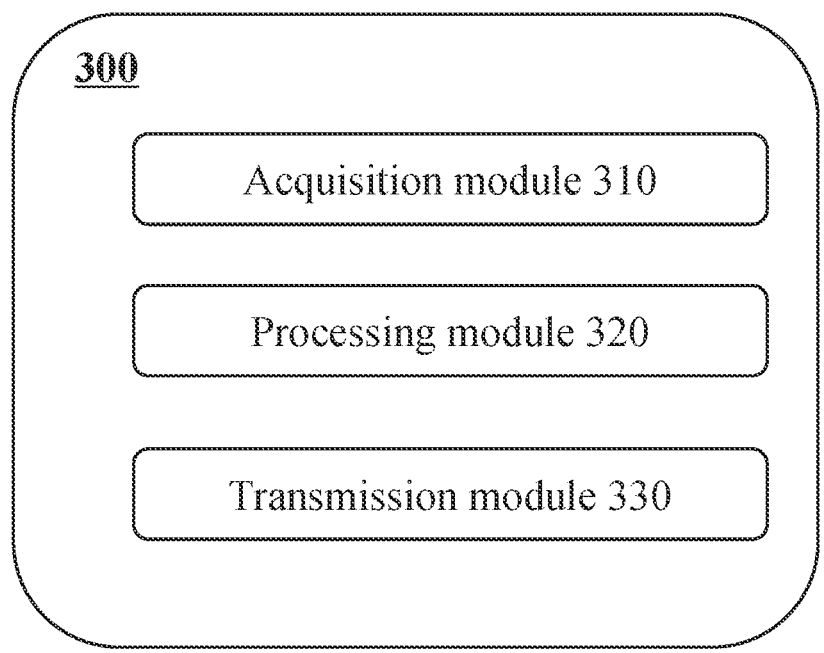
FIG. 3 is a block diagram illustrating an exemplary system 300 for measuring energy of natural gas according to some embodiments of the present disclosure.

FIG. 3 is a block diagram illustrating an exemplary system 300 for measuring energy of natural gas according to some embodiments of the present disclosure. The system 300 may be arranged on the management platform. In some embodiments, the system 300 may include an acquisition module 310, a processing module 320, and a transmission module 330.

The acquisition module 310 may be used to obtain a natural gas detection parameter detected by a sense network platform via a sense network platform in response to a query request received by the user platform. More information for the query request and the natural gas detection parameter may be shown in FIG. 4 and related descriptions.

The processing module 320 may be used to determine natural gas metering data by processing the natural gas detection parameter. In some embodiments, the processing module 320 may process at least one first detection parameter based on a predetermined algorithm, determine first energy data, and the at least one first detection parameter may be detected by a first detection device. In some embodiments, the processing module 320 may also process at least one second detection parameter based on a prediction model, determine second energy data, and the at least one second detection parameter may be detected by a second detection device. More information for processing module 320 may be shown in FIGS. 4 and 5 and related descriptions.

The transmission module 330 may be used to transmit the natural gas metering data to the user platform via a service platform. In some embodiments, the transmission module 330 may transmit at least one of energy data and volume data to the user platform based on the query request. More information for energy data and volume data may be shown in FIG. 4 and related descriptions.

It should be noted that the above descriptions for the system 300 are merely provided for the purposes of illustration, and not intended to limit the scope of the present disclosure. It should be understood, for person skilled in the art, after understanding the basic principle of the system 300, it is possible to make various combinations with components, or make sub system to connect other components without departing from this principle. In some embodiments, the acquisition module 310 disclosed in FIG. 3, the processing module 320, and the transmission module 330 may be different modules in a system, or one module implementation of the two or more modules described above. For example, each module may share a storage module, and each module may also have respective storage modules. Such deformation is within the scope of the present disclosure.

Figure 4:
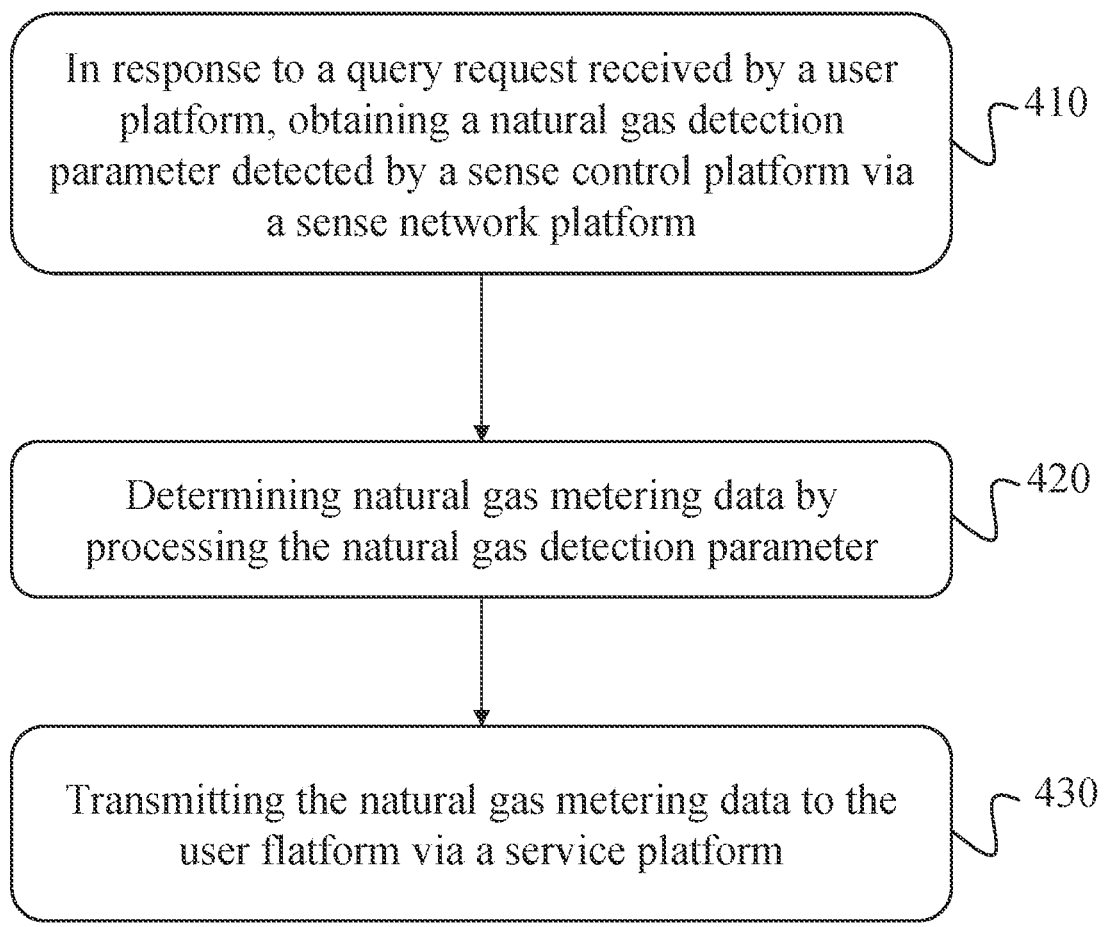
FIG. 4 is a flowchart illustrating an exemplary method for measuring energy of natural gas according to some embodiments of the present disclosure.

FIG. 4 is a flowchart illustrating an exemplary method for measuring energy of natural gas according to some embodiments of the present disclosure. As shown in FIG. 4, a flow 400 may include the following operations. In some embodiments, the flow 400 may be executed by a processor (e.g., processor 220). For example, the flow 400 may be stored in a storage device in the form of a program or instruction, and the flow 400 may be implemented when the processor or the module shown in FIG. 3 executes a program or instruction. In some embodiments, the flow 400 may be accomplished by using one or more additional operations not described below, and/or not by one or more of the following operations discussed below.

In operation 410, in response to a query request received by a user platform, a natural gas detection parameter detected by a sense control platform may be obtained via a sense network platform. In some embodiments, the operation 410 may be executed by the acquisition module 310.

The user platform may be the management system or platform of a gas supply network. The user platform may be used to receive the query request input by a user, or may be used to obtain the natural gas metering data determined by the management platform. More information for the user platform may be shown in FIG. 1 and related descriptions.

The query request may be a request for querying data related to natural gas. For example, the query request may be a request for querying natural gas volume data, energy data, or the like.

In some embodiments, the query request may include volume data query and energy data query. The volume data query is a request for querying the volume data of natural gas, and the energy data query is a request for the energy data of natural gas. The volume data may be data related to natural gas volume, and energy data may be data related to natural gas energy. Volume data and energy data may be used to perform natural gas billing. In some embodiments, the volume data and energy data may be determined according to the natural gas detection parameters, more information for determining volume data and energy data may refer to the operation 420.

In some embodiments, the query request may be directed to one of the pipe network ends and/or the user ends in the gas supply network. For example, the query request may be a volumetric data query for one of the pipe network ends in the gas supply network. In some embodiments, the query request may also be a request for the gas flow or pressure of natural gas.

The sense network platform may be a gateway device for transmitting data and/or information. For example, the sense network platform may be used to provide a data transmission network between a sense control platform and a management platform. More information for sense network platforms may refer to FIG. 1 and related descriptions.

The sense control platform may be used to obtain the natural gas detection parameter. In some embodiments, the sense control platform may include at least one detection device, and the sense control platform may obtain the natural gas detection parameter based on the at least one detection device. More information for the sense control platform may be shown in FIG. 1 and related descriptions.

The natural gas detection parameter may be a parameter related to natural gas. For example, the natural gas detection parameter may include natural gas density, natural gas temperature, natural gas pressure, natural gas components, content of each component, natural gas flow, natural gas compression factor, or the like. The natural gas detection parameter may be detected by the at least one detection device. In some embodiments, the natural gas detection parameter may also be predetermined, and a predetermined natural gas detection parameter may be provided by a pipe network back end (e.g., a natural gas supplier). For example, physical property parameters such as natural gas components, natural gas compression factors, natural gas density, and natural gas fever may be provided by the pipe network back end.

The at least one detection device may be used to detect parameters related to natural gas. The at least one detection device may include a component sensor, a gas meter, a temperature sensor, a pressure sensor, or the like. The component sensor may be used to measure the components and content of natural gas, and the component sensor may include a gas chromatograph. The gas meter may be used to measure flow and quality of natural gas. The gas meter may include ultrasonic flowmeter, membrane gas meter, turbine flowmeter, orifice flowmeter, nozzle flowmeter, precession vortex flowmeter, volumetric flowmeter, mass flowmeter, flowmeter computer, or the like. The temperature sensor may be used to measure temperature of natural gas, and the pressure sensor may be used to measure the pressure of the gas.

A type of a detection device for detecting the natural gas detection parameter may be determined based on the natural gas detection parameter obtained. For example, when a needed natural gas detection parameter is natural gas component data, the detection device may be a gas chromatograph.

In some embodiments, the sense control platform may include at least one first detection device at a pipe network end. The pipe network end may be an important node in the gas supply network, for example, a gas supply station in the gas supply network, a natural gas control point of a particular area (e.g., a residential area), or the like.

In some embodiments, the acquisition module 310 may detect at least one first detection parameter via the at least one first detection device, and the at least one first detection parameter may be a parameter related to natural gas detected by the at least one first detection device, and the at least one first detection device may be a detection device at the pipe network end. At the pipe network end, many types of detection devices with high precision may be used to detect the natural gas detection parameter. Therefore, the at least one first detection device may be used to detect all types of natural gas detection parameters, that is, the at least one first detection parameter that the acquisition module 310 may obtain at the pipe network end may include all types of natural gas detection parameters. For example, the at least one first detection parameter may include natural gas density, natural gas temperature, natural gas pressure, natural gas component, content, natural gas flow, natural gas compression factor, or the like.

Figure 5:
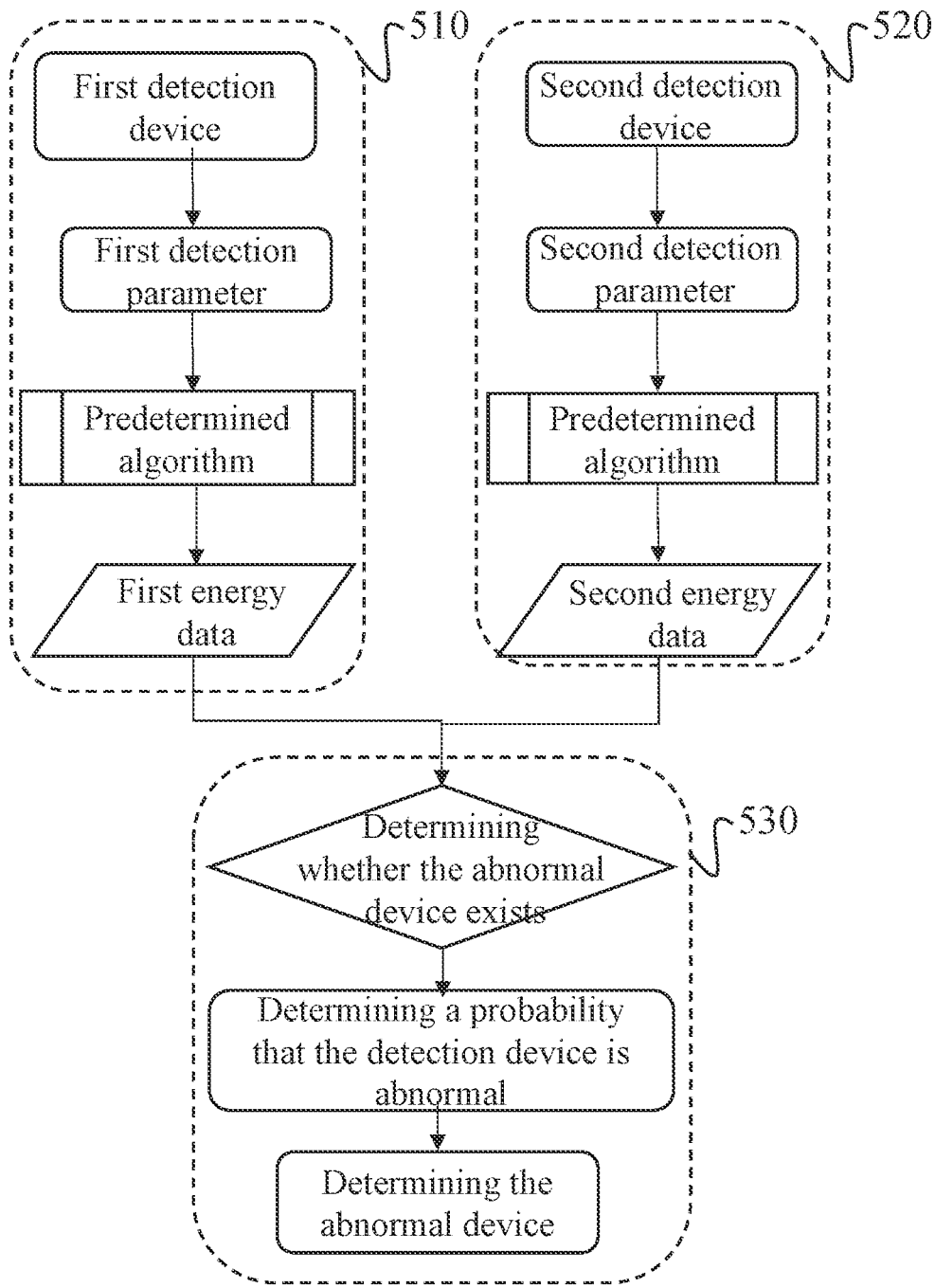
FIG. 5 is a flowchart illustrating an exemplary method for determining natural gas metering data according to some embodiments of the present disclosure.

In some embodiments, the at least one first detection parameter may be used to determine first energy data, and more detailed descriptions for determining the first energy data may refer to FIG. 5 and related descriptions.

In some embodiments, the sense control platform may include at least one second detection device at the user end. The user end may be a gas terminal in the gas supply network, for example, smart gauges in houses of a residential area.

In some embodiments, the acquisition module 310 may detect at least one second detection parameter via at least one second detection device, the at least one second detection parameter may be a parameter related to natural gas detected by the at least one second detection device, and the at least one second detection device may be a detection device at the user end. Few types of detection devices with low accuracy may be used at the user end to detect the natural gas detection parameter. Therefore, the at least one second detection device may be only used to detect some types of natural gas detection parameters, that is, the at least one second detection parameter that the acquisition module 310 may obtain at the pipe network end include some types of the natural gas detection parameter. For example, the at least one second detection parameter may merely include natural gas detection parameters such as natural gas pressure, natural gas temperature, or natural gas components (provided by pipe network back end).

The at least one second detection parameter may be used to determine second energy data, and more detailed description for determining the second energy data may refer to FIG. 5 and related descriptions.

In some embodiments, in order to facilitate the system for measuring energy of natural gas to detect and measure the natural gas data of multiple user ends controlled by the pipe network end, more accurate and detailed natural gas detection parameter may be required at the pipe network end. Therefore, there are many types of first detection devices with high precision at the pipe network end may be used to detect a plurality of natural gas detection parameters with high precision. However, cost of installing many types of detection devices at the user end is high and the installation is difficult. At the same time, due to the high installation cost and later maintenance cost of detection devices with high precision (e.g., update and maintenance frequency of high-precision detection device is high), it is not ideal to install detection device with high precision at the user end. Therefore, the second detection devices at the user end may have fewer types and low accuracy, and the second detection devices may only detect a partial of natural gas detection parameters, and some parameters that are easy to detect (e.g., natural gas pressure, natural gas density, etc.). For example, the at least one first detection device at the pipe network end may be a detection device with high precision such as an ultrasonic flowmeter, a turbine flowmeter, a hole plate flowmeter, a gas chromatograph, or the like. At the same time, detection devices for detecting various natural gas detection parameters may be set at the pipe network end, such as component sensor for measuring the component and content of natural gas, gas meter for measuring the flow and quality of natural gas, temperature sensor for measuring the temperature of natural gas, pressure sensor for measuring the pressure of gas, or the like. For another example, the second detection device at the user end may be a detection device with low precision such as a mode gas meter, a nozzle flow meter, or a detection device such as a pressure sensor, a temperature sensor, or the like.

In some embodiments, in response to a different query request, the acquisition module 310 may control a detection device corresponding to the sense control platform to obtain a corresponding natural gas detection parameter. For example, when the query request is a volume data query, the acquisition module 310 may control the gas meter for detection to obtain a corresponding natural gas detection parameter comprising volume data. When the query request is energy data query, the acquisition module 310 may control the temperature sensor, pressure sensor, component sensor for detection, and another corresponding natural gas detection parameter may include natural gas temperature, natural gas pressure, natural gas composition, content of each component. The processing module 320 may process another corresponding natural gas detection parameter to determine the energy data. More detailed description for determining energy data may refer to operation 420.

In some embodiments, the acquisition module 310 may obtain the natural gas detection parameter in real time by the sense control platform, and periodically generate detection logs including the natural gas detection parameter. When the user platform receives the query request input by the user, the acquisition module 310 may determine the corresponding natural gas detection parameter according to the plurality of detection logs saved in the sense control platform. For example, after receiving the query request, the acquisition module 310 may directly adjust the detection log that is closest to the time receiving the query request, and extract the corresponding natural gas detection parameter.

In response to the query request received by the user platform, the sense control platform may detect the corresponding natural gas detection parameter based on the detection device. The management platform may obtain the natural gas detection parameter via the sense network platform, and process the natural gas detection parameter to determine natural gas metering data, and send natural gas meter data to the user platform via the service platform.

Interaction of a plurality of platforms in the IOT system for measuring energy of natural gas may quickly and accurately realize metering and query of natural gas, facilitating the gas supply mechanism for statistical and billing.

In operation 420, the natural gas detection parameter may be processed to determine the natural gas metering data. In some embodiments, the operation 420 may be executed by processing module 320.

The natural gas metering data may be data for reactive natural gas related information. For example, the natural gas metering data may be data reflecting energy and/or volume of natural gas.

In some embodiments, the natural gas metering data may include at least one of energy data or volume data. The energy data may be data indicating heat generated by natural gas, and volume data may represent the volume of natural gas in standard cases.

In some embodiments, the processing module 320 may process the natural gas detection parameter to determine the volume data of natural gas. For example, the processing module 320 may process the natural gas detection parameter (e.g., natural gas flow, natural gas temperature, natural gas pressure, natural gas compression factor, etc.) to determine the volume data of natural gas by the following formula (1):

$$V_n = = V_t \times P_t / P_n \times (273.15 + T_n)/(273.15 + T_t) \times F_z^2 \quad (1)$$

where $F_z = \sqrt{Z_n/Z_t}$ is a super compression factor, $Z_n$ is a natural gas compression factor in the standard state (i.e., a atmospheric pressure of 101.325 kpa and a temperature of 20° C.), $Z_t$ is a natural gas compression factor obtained by the detection device, $V_n$ is a natural gas flow in the standard state, $V_t$ is a natural gas flow obtained by the detection device, P n is the natural gas pressure intensity under the standard state, $P_t$ is a natural gas pressure obtained by the detection device, $T_n$ is a natural gas temperature under standard state, and $T_t$ is a natural gas temperature obtained by the detection device.

The above determined volume data of natural gas may be natural gas flow in a unit time in the standard state. In some embodiments, $Z_n$, $P_n$, and $T_n$ may be predetermined. $Z_t$, $P_t$ and $T_t$ may be provided by the pipe network back end or may be obtained by detection of the detection device.

In some embodiments, the processing module 320 may process the natural gas detection parameter to determine energy data of natural gas. For example, the processing module 320 may process the natural gas detection parameter (e.g., natural gas components, content, natural gas pressure, natural gas compression factor, etc.) to determine energy data of natural gas by the following formula (2):

$$E = (\tilde{H}[t_1, V(t_2, p_2)] \times V_n) \quad (2)$$

where E is energy generated by the complete combustion of natural gas in the standard state, $\tilde{H}[t_1, V(t_2, p_2)]$ is a real volume calorific value of natural gas, $v_n$ is a natural gas flow under the standard state, $t_1$ is a temperature of combustion reference condition, $t_2$ is a temperature of meter reference condition, $p_2$ is a pressure.

In some embodiments, the real volume calorific value of natural gas may be determined by the following formula (2-1):

$$\tilde{H}[t_1, V(t_2, p_2)] = \frac{\tilde{H}^0[t_1, V(t_2, p_2)]}{Z_{mix}(t_2, p_2)} \quad (2-1)$$

where $\tilde{H}^0[t_1, V(t_2, p_2)]$ is an ideal volume calorific value of natural gas as ideal gas under temperature $t_1$, $Z_{mix}$ is a compression factor under meter reference condition (i.e., $p_2$ is a compression factor at a standard atmospheric pressure under a temperature $t_2$ with 20° C.).

In some embodiments, the ideal volume calorific value of natural gas may be determined by formula (2-2):

$$\tilde{H}^0[t_1, V(t_2, p_2)] = \overline{H}^0(t_1) \times \frac{p_2}{R \cdot T_2} \quad (2-2)$$

where $\overline{H}^0(t_1)$ is a molar volume calorific value of natural gas as ideal gas under temperature $t_1$, R is the molar gas constant, $T_2$ is an absolute temperature, $T_2 = t_2 + 273.15$.

In some embodiments, the molar volume calorific value of natural gas may be determined by formula (2-3):

$$\overline{H}^0(t_1) = \Sigma_{j=1}^{N} x_j \cdot \overline{H}_j^0(t_1) \quad (2-3)$$

where $\overline{H}_j^0(t_1)$ is a molar volume calorific value of component j under combustion reference temperature $t_1$ when natural gas is ideal gas.

In summary, a formula (3) for determining the energy data of natural gas may be as follows:

$$E = (\tilde{H}[t_1, V(t_2, p_2)] \times V_n) = \sum_{j=1}^{N} x_j \cdot \overline{H}_j^0(t_1) \times \frac{p_2}{Z_{mix}(t_2, p_2) \cdot R \cdot T_2} \times V_n \quad (3)$$

The energy data of natural gas determined by above formulas may be the energy data of natural gas with volume data of V n under standard state. In some embodiments, $\tilde{H}^0[t_1, V(t_2, p_2)], \tilde{H}_j^0[t_1, V(t_2, p_2)]$ and $\overline{H}_j^0(t_1)$ may be predetermined, and a calculation operation for determining the energy data of natural gas may be performed according to an actual predetermined value.

In some embodiments, the processing module 320 may process the natural gas detection parameters obtained by different gas supply nodes of the gas supply network by using a different method to determine energy data. For example, for a first detection parameter obtained from the pipe network, the processing module 320 may process the first detection parameter based on the formula (3) to determine a corresponding energy data (i.e., first energy data). For example, for a second detection parameter obtained by the user end, the processing module 320 may process the second detection parameter based on the prediction model to determine the corresponding energy data (e.g., the second energy data). More information for processing the first detection parameter and the second detection parameter may refer to FIG. 5 and related descriptions.

In some embodiments, the processing module 320 may also process the natural gas detection parameter directly on one or more sense control platforms to determine the natural gas metering data.

By processing natural gas detection parameter directly on one or more sense control platforms, a count of calculation of the management platform may be shared by each sense control platform, the performance requirements of the management platform may be reduced, and operational efficiency of the system may be improved.

In operation 430, the natural gas metering data may be sent to the user platform via the service platform. In some embodiments, the operation 430 may be executed by the transmission module 330.

The service platform may be used to perform service information delivery or storage. For example, the natural gas metering data may be periodically sent into the service platform, more information for the service platform may refer to FIG. 1 and related descriptions.

In some embodiments, the transmission module 330 may send the natural gas metering data to the user platform via the service platform after the service platform receiving natural gas metering data. In some embodiments, the service platform may store natural gas metering data in advance, and when the user platform receives the query request, the transmission module 330 may send natural gas metering data to the user platform.

In some embodiments, the service platform may encrypt the natural gas metering data to ensure the safety of natural gas metering data. When the user platform receives the query request, the transmission module 330 may process the data encrypted in the service platform, and send corresponding natural gas metering data to the user platform via the service platform.

In some embodiments, the transmission module 330 may send at least one of the energy data or volume data to the user platform via the service platform according to the type of query request, that is, the transmission module 330 may send the energy data and/or volume data corresponding to the query request to the user platform according to the type of query request. For example, when the query request is queried by volume data, the transmission module 330 may send the volume data of natural gas to the user platform.

The corresponding natural gas metering data may be sent to the user platform according to the type of query request, and corresponding data may be obtained on target, and the gas supply mechanism of different metering methods may be charged according to the natural gas metering data. At the same time, the corresponding data obtained on target may reduce the amount of calculation of a system for measuring energy of natural gas and improve the transmission efficiency of the system.

The method for measuring energy of natural gas may be implemented by interaction of each platform and/or system in the IOT system for measuring energy of natural gas, including acquisition and feedback of related data of natural gas (e.g., the natural gas detection parameter, natural gas metering data).

FIG. 5 is a flowchart illustrating an exemplary method for determining natural gas metering data according to some embodiments of the present disclosure. As shown in FIG. 5, a flow 500 may include the following operations. In some embodiments, the flow 500 may be executed by a processor (e.g., the processor 220). For example, the flow 500 may be stored in the storage device in the form of a program or instruction, and the flow 500 may be executed when the processor or the module shown in FIG. 3 executes a program or instruction. In some embodiments, the flow 500 may be executed by using one or more additional operations not described below, and/or not by one or more of the following operations discussed below.

In operation 510, the at least one first detection parameter may be processed based on a predetermined algorithm, and the first energy data may be determined. In some embodiments, the operation 510 may be executed by processing module 320.

In some embodiments, the at least one first detection parameter may be used to determine the energy data of natural gas at the pipe network end. The first energy data may be energy data of natural gas at the pipe network end. In some embodiments, the first energy data may be an energy value of the unit mass or an energy value of the unit volume.

The predetermined algorithm may be used to determine the first energy data based on the at least one first detection parameter. For example, the predetermined algorithm may be the formula (3) in the above operation 420.

In some embodiments, after the at least one first detection parameter is determined by the first detection device, the processing module 420 may process the at least one first detection parameter by using a predetermined algorithm to determine the first energy data.

Due to the high precision and many types of detection devices at the pipe network end, the natural gas detection parameter at the pipe network end may have high precision and many types. Therefore, the natural gas measurement data may be calculated directly according to the predetermined algorithm, which may be convenient for subsequent data proofreading and fault inspection.

In operation 520, a second energy data may be determined by processing at least one second detection parameter based on the prediction model, and the second energy data may be determined. In some embodiments, the operation 520 may be executed by processing module 320.

In some embodiments, the at least one second detection parameter may be used to determine energy data of natural gas at the user end. The second energy data may be energy data of natural gas at the user end. In some embodiments, the second energy data may be an energy value of the unit mass or an energy value of the unit volume.

The prediction model may determine the second energy data based on the at least one second detection parameter. The prediction model may be a machine learning model, such as a deep neural networks (DNN) model. An input of the prediction model may include at least one second detection parameter (e.g., natural gas temperature, natural gas pressure, natural gas component, natural gas density, etc.), and an output of the prediction model may be the second energy data (i.e., the energy value of the unit mass or unit volume).

Parameters of the prediction model may be obtained by training. In some embodiments, the prediction model may be obtained based on a large number of training samples with labels. For example, training samples with labels may be input into an initial prediction model, the loss function may be constructed by the prediction result of the label and the initial prediction model, and the parameters of the model may be updated based on iteration of the loss function. When a training model meets predetermined conditions, the training may end. The predetermined conditions may be a convergence of the loss function, or a count of iterations reaching a threshold.

The training samples may include at least one sample second detection parameter detected at least one sample user end, and a label may be a second energy data corresponding to the at least one sample second detection parameter. In some embodiments, the label may be obtained by processing a sample first detection parameter obtained by the sample pipe network corresponding to the sample user end based on the predetermined algorithm. The sample pipe network end corresponding to the sample user end may be a pipe network end that measures a same object with the sample user. For example, when taking the second detection parameter obtained at a user end at a historical time as a training sample, a first detection parameter of the pipe network end close to the user end at the same time (for example, within 5 km) may be obtained, and a corresponding first energy data may be determined by processing the first detection parameter based on the predetermined algorithm. The first energy data may be a label corresponding to the sample second detection parameter.

In some cases, the sample user end may not exist the corresponding sample pipe network. In order to collect training data and ensure effect of the training model, in some embodiments, the training sample of the prediction model may also include at least one sample first detection parameter detected at the sample pipe network end, and a corresponding label may be first energy data corresponding to at least one sample first detection parameter. In some embodiments, the label may be obtained by processing the at least one sample first detection parameter based on the predetermined algorithm.

If the training samples used to train the prediction model are collected based on the sample pipe network end, in some embodiments, when the prediction model is actually applied, and the second energy data of the user end is determined based on the input second detection data of the user end, the features input in the actual application may be processed because the training samples are different from the feature types input in the actual application. For example, a value of a feature type of the actual application may be set to a predetermined value, such as 0, or the like.

In some embodiments, the training samples of the prediction model may also include at least one sample natural gas detection parameter detected by other sample gas supply nodes (e.g., other sample user ends), and the relationship between the sample user ends and other sample gas supply nodes (e.g., distance relationship in the gas supply network, etc.). A corresponding label may be first energy data corresponding to the at least one sample first detection parameter. The corresponding label may be obtained by processing the first detection parameter obtained at the pipe network end based on the predetermined algorithm. Thereby, the prediction model may be further strengthened to improve the prediction accuracy of the prediction model.

Correspondingly, in addition to at least one second detection parameter detected at the current user end, the input of the prediction model may also include the natural gas detection parameter obtained by other gas supply nodes (for example, other user ends) and the relationship between other gas supply nodes and the current user end. For example, the input of the prediction model may further include the second detection parameter obtained at another user end of the current user end whose distance is closer to the current user end (e.g., within 3 km), and the relationship between the current user end and another user end. For example, when second energy data of a house of a residential area is determined by using the prediction model, in addition to inputting the second detection parameter detected at the house into the prediction model, second detection parameter detected at other houses in the same gas supply network of the residential area and the relationship between other houses and the house may also be input into the prediction model as input parameters for prediction. Thereby, it is possible to sufficiently consider the influence of the natural gas use of other gas supply nodes on the current user end, thereby increasing the prediction accuracy of the prediction model.

Since the detection device at the user end may be with low precision, and using detection devices with high precision may be difficult, the natural gas detection parameters at the user end may be with low precision and few species, and the natural gas metering data may not be directly determined by the predetermined algorithm. The prediction model may accurately predict the corresponding natural gas metering data in the case that types of the natural gas detection parameter type is few.

It should be noted that the operation 510 and 520 may not be executed in order, the operation 510 and 520 may be executed separately or jointly according to actual needs. For example, when a center of the pipe network needs to obtain energy data, the operation 510 may be executed separately.

In operation 530, an abnormal device may be determined based on the first energy data and the second energy data. In some embodiments, the operation 530 may be executed by the processing module 320.

In some embodiments, the processing module 320 may determine whether there is an abnormal device based on the first energy data and the second energy data. In response to determining that the abnormal device exists, for each detection device of the at least one first detection device and the at least one second detection device, the processing module 320 may determine a probability that the detection device is abnormal based on related information of the detection device, the first energy data, and the second energy data, and determine the abnormal device based on the probability. More detailed descriptions for determining the abnormal device may refer to FIG. 6 and related descriptions.

Figure 6:
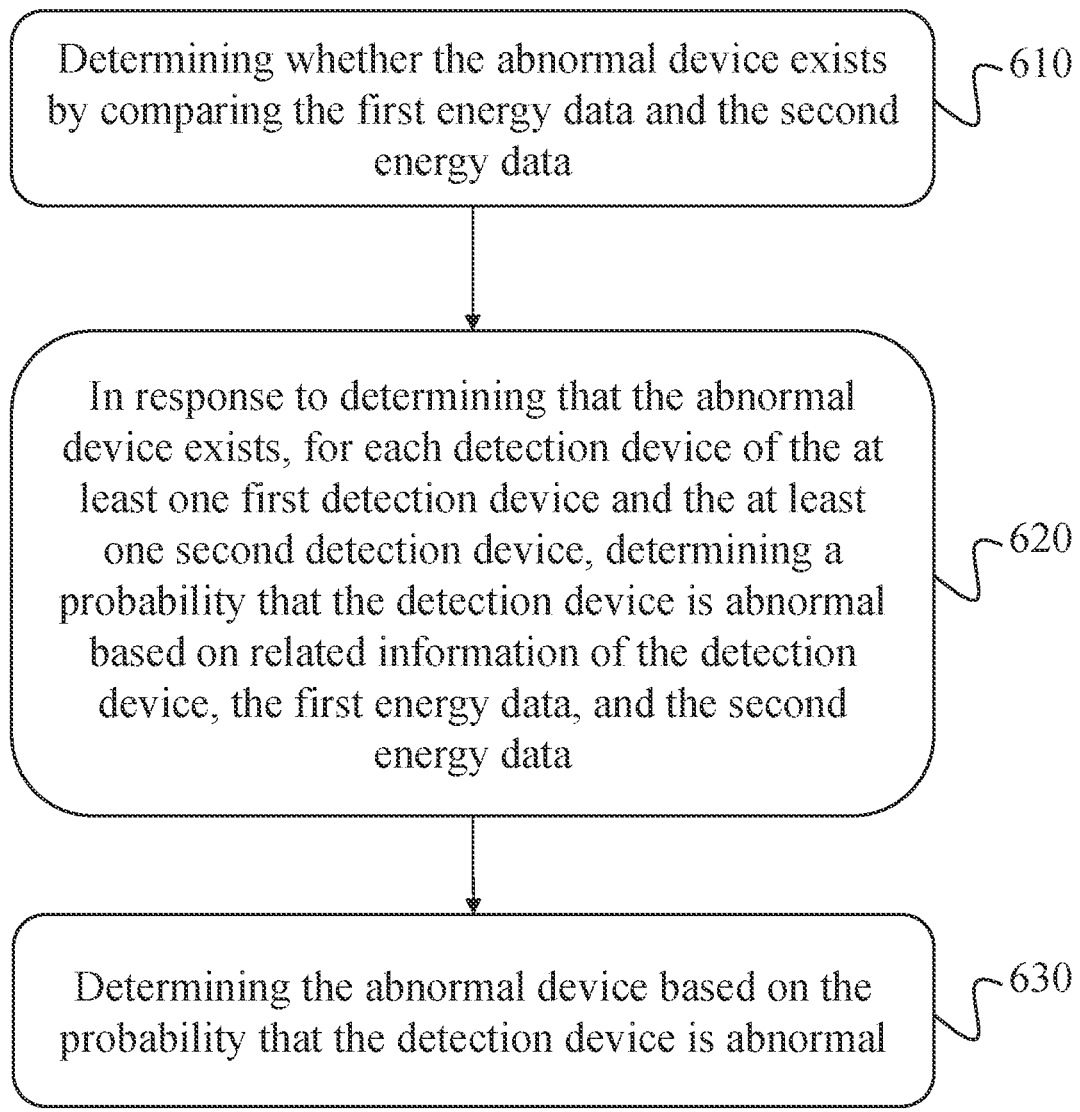
FIG. 6 is a flowchart illustrating an exemplary method for determining an abnormal device according to some embodiments of the present disclosure.

FIG. 6 is a flowchart illustrating an exemplary method for determining an abnormal device according to some embodiments of the present disclosure. As shown in FIG. 6, a flow 600 may include the following operations. In some embodiments, the flow 600 may be executed by a processor (e.g., the processor 220). For example, the flow 600 may be stored in a storage device in the form of a program or instruction, and the flow 600 may be executed when the program or the module shown in the processor or FIG. 3 executes the program or instruction. In some embodiments, the flow 600 may be executed by using one or more additional operations not described below, and/or not by one or more of the following operations discussed below.

In operation 610, the first energy data and the second energy data may be performed a comparison operation to determine whether there is an abnormal device. In some embodiments, the operation 610 may be executed by the processing module 320.

The abnormal device may be a detection device in an abnormal state or a detection device detecting abnormal data. For example, an abnormal device may include a detection device that is not in a working state, detecting an error parameter, or the like. When there is an abnormal device, the natural gas detection parameter obtained by the sense control platform may have an error, which causes the first energy data or the second energy data inaccurate.

The comparison operation may be used to determine a difference between the first energy data and the second energy data. A result of the comparison operation may be used to determine whether the abnormal device exists. When the difference between the first energy data and the second energy data exceeds a predetermined threshold, there is an abnormal device in the detection device. The predetermined threshold may be a threshold between predetermined first energy data and the second energy data. For example, the predetermined threshold may be 50 J/m³.

In operation 620, in response to determining that the abnormal device exists, for each detection device of the at least one first detection device and the at least one second detection device, a probability that the detection device is abnormal may be determined based on related information of the detection device, the first energy data, and the second energy data.

The related information of the detection device may refer to information related to the detection device. The related information of the detection device may include working environment of the detection device (e.g., a temperature of the working environment, pressure of the working environment, etc.), detection parameters corresponding to the detection device, device information of the detection device, or the like. The device information of the detection device may include an error range of the detection device, a type of the detection device, a model of the detection device, a maintenance record of the detection device, service time of the detection device, or the like.

In some embodiments, the processing module 320 may determine the probability that the detection device is abnormal according to the related information of the detection device, the first energy data, and the second energy data. For example, the processing module 320 may determine the probability that the detection device is abnormal by an abnormality determination model. The abnormality determination model may be used to determine the probability that the detection device is abnormal.

The abnormality determination model may be a machine learning model, such as a DNN model, a transformer model, or the like. An input of the abnormality determination model may include the related information of the detection device, the first energy data, and the second energy data. An output of the abnormality determination model may be the probability that the detection device is abnormal.

In some embodiments, the processing module 320 may separately input related information, first energy data, and second energy data of each detection device into the abnormality determination model, respectively, and determine the probability that the detection device is abnormal. For example, the related information of the detection device a, the first energy data, and the second energy data may be input into the abnormality determination model, and the probability that the detection device a is abnormal may be determined.

In some embodiments, the processing module 320 may construct a related information input vector based on the related information of each detection device, and the related information input vector may correspond to the related information of each detection device one by one. The related information input vector, the first energy data, and the second energy data may be input into the abnormality determination model to output abnormal probability vectors, and the abnormal probability vectors may correspond to probabilities that the detection device is abnormal one by one. For example, the related information input vector may be (a, b, c . . . ), where a is related information of the detection device a, b is the related information of the detection device b, and c is related information of the detection device c. The related information input vector (a, b, c . . . ), the first energy data and the second energy data may be input into the abnormality determination model. An abnormal probability vector (0.1, 0.6, 0.2 . . . ) may be output, where 0.1 is an abnormal probability of detection device a, 0.6 is an abnormal probability of detection device b, and 0.2 is an abnormal probability of detection device c.

Parameters of the abnormality determination model may be obtained by training. In some embodiments, the abnormality determination model may be obtained based on a large number of training samples with labels. For example, the training samples with labels may be input into an initial abnormality determination model, and a loss function is constructed based on a prediction result of the initial exception determination model and labels, and parameters of the abnormality determination model may be updated based on iteration of the loss function. When a training model meets predetermined conditions of the abnormality determination model, the training may end. The predetermined conditions of the abnormality determination model may be a convergence of the loss function, or a count of iterations reaching a threshold.

The training samples of the abnormality determination model may at least include the related information of a sample detection device, sample first energy data, and sample second energy data. The labels may be probabilities that the sample detection device is abnormal. In some embodiments, the labels may be obtained by artificial labeling.

In operation 630, an abnormal device may be determined based on the probability that the detection device is abnormal. In some embodiments, the operation 630 may be executed by the processing module 320.

In some embodiments, the processing module 320 may determine the detection device as an abnormal device when the probability that the detection device is abnormal is greater than a predetermined threshold. The predetermined threshold may be a predetermined probability (e.g., 0.5). For example, when the probability that the detection device a is abnormal is 0.6, the predetermined threshold is 0.5, that is, the detection device a is an abnormal device.

By judging whether there is an abnormal device, it is possible to avoid the impact of the equipment abnormality on the meter of natural gas, and improve the accuracy of natural gas metering. At the same time, by positioning the abnormal device, the abnormal device may be processed in time to ensure the stability of the IOT system for measuring energy of natural gas.

The present disclosure may provide a non-transitory computer-readable medium. The non-transitory computer-readable medium may comprise at least one set of instructions, wherein when executed by at least one processor of a computer device, the at least one set of instructions may direct the at least one processor to perform method for measuring energy of natural gas as described in above-mentioned embodiments.

The present disclosure may provide an Internet of Things (IOT) system for measuring energy of natural gas, including a user platform, a service platform, a management platform, a sense network platform, a sense control platform, wherein the user platform may be a management system of a pipe network company. The service platform may be a service information server. The management platform may be an energy metering management system. The sense network platform may provide network and gateways for the information interaction of the sense control platform and management platform. The sense control platform may be a natural gas energy metering terminal. The natural gas energy metering terminal may be disposed at the gas supply terminal of the pipe network (also referred to as a gas terminal) or a gas supply node, and a natural gas detection parameter of the gas supply terminal or gas supply node may be obtained. The natural gas energy metering terminal may transmit the natural gas detection parameter through the sense network platform to an energy metering management system. The energy metering management system may process the natural gas detection parameter to generate natural gas metering data, the energy metering management system may send the natural gas metering data to the service information server.

When the management system requests natural gas data to the service information server, the service information server sends a natural gas metering data that matches the request for the management system of the pipe network to the management network management system.

In this embodiment, when the applicant has used the Internet of Things five-platform systems that have been developed before, measuring energy for natural gas may be systematically modified.

In the embodiment, the interaction process and function among user platform, service platform, management platform, sense network platform and sense control platform have been fully described in previous patent of the applicant, and detailed description may not be described herein. This embodiment may be mainly in the field of energy metering of natural gas, which may be convenient for existed methods for measuring energy of natural gas. The user platform may be a management system of the pipe network company. Main role of the user platform may be to provide corresponding data for the back end, such as pipe network users, pipe network centers, or the like. The service platform may be a service information server, which may be used for the transmission of service information. Through the service information server, the information data of each functional module of the management system may be classified and extracted, so as to provide the necessary data information of the natural gas energy metering Internet of things system for the management system of the pipe network company. The management platform may be a core of the whole Internet of things platform. In the present disclosure, the management platform may be an energy metering management system, which may provide local computing and cloud computing for the whole system. The sense control platform may be a natural gas energy metering terminal, which may be arranged on the gas consumption terminal, such as a smart gas meter, or on the gas transmission node (also known as the gas supply node), such as the gas consumption control mechanism in an area.

The natural gas detection parameter may be collected through the natural gas energy measurement terminal, including temperature, pressure, composition, content, flow, compression factor, density, or calorific value. The gas components and content may be measured by component sensors such as gas chromatograph, and the gas measuring instruments such as ultrasonic flowmeter, membrane gas meter, turbine flowmeter, orifice flowmeter nozzle flowmeter, precession vortex flowmeter, volumetric flowmeter, mass flowmeter, flow totalizer, flow computer, etc. collect the volume flow or mass flow of gas, measure the temperature of gas with temperature sensor, measure the pressure of gas with a pressure sensor, and the physical parameters such as compression factor, density or calorific value shall be provided by the gas supplier. The above sensors may be integrated to form the whole natural gas energy metering device: metering skid, which may realize the collection of various information of natural gas.

The collected information may be calculated directly at the natural gas energy metering terminal or may be sent to the energy metering management system through the sense network platform. The energy metering management system may carry out a unified calculation. Combined with an existing intelligent gas meter Internet of things system, the transformation of the overall system may be completed under the condition of little change in the terminal intelligent gas meter.

The sense network platform may use ProfNet, 5G, Ethernet, and other transmission technologies and gateways to transmit the data packets obtained by the sense control platform to the energy metering management system for comprehensive calculation. At the same time, the sense network platform may also include the sense network management system, which may realize various protocol conversion and communication management. The sensor network management system may make the gas metering Internet of things system compatible with sensors or metering systems from different manufacturers. It may be used for the upgrading of old systems to save costs. It may also be used for the construction of new projects to increase the flexibility of sensor selection. By setting the above system architecture, the present disclosure may provide a reliable scheme for the system for measuring energy of natural gas. At the same time, due to this design, the existing smart meter internet may be easy to be transformed and the applicability of the system may be improved.

In order to further illustrate the working process of this embodiment, when the natural gas detection parameter collected by the natural gas energy metering terminal may include the chromatographic data and volume data of natural gas, the natural gas energy metering terminal may obtain the chromatographic data of natural gas samples through the chromatographic sensor. The natural gas energy metering terminal may obtain the volume data of the natural gas sample through an ultrasonic sensor.

When the energy metering management system receives the natural gas detection parameter, the energy metering management system may obtain the energy data corresponding to the volume data according to the chromatographic data and volume data, take the energy data as the first data in the natural gas metering data, and take the volume data as the second data in the natural gas metering data.

During the implementation of this embodiment, the volume data and chromatographic data may be obtained through the natural gas energy metering terminal, and then the energy data may be obtained through the energy metering management system. After the energy data and volume data are processed separately, when the requested data is energy data, such as foreign trade, energy data may be requested. When the requested data is volume data, for example, when individual users query the gas consumption, they may request volume data, which may improve the compatibility of the system, and may well improve the smoothness of the transition in the process of changing the metering mode.

For further explanation of the operation of the present embodiment, the pipe network company management system may include a user platform A, a service platform A, a management platform A, a sense network platform A, and a sense control platform A. The sense control platform A is a terminal receiving the natural gas metering data. The management platform A may obtain the natural gas metering data through the sense network platform A. The user platform A may be a terminal requesting the natural gas metering data. When the user platform A requests the natural gas metering data to the service platform A, the service platform A may transmit the request of the user platform A to the management platform A. The management platform A may process the request and send the processed request to the sense control platform A through the sense network platform A. The sense control platform A may transmit the processed request as a request for the pipe network management system to the service information server.

During the implementation of this embodiment, the management system of the pipe network company as the user platform may also adopt the five-platform structure, in which the sense network platform A may be the terminal receiving natural gas measurement data, such as the server for data collection and distribution, and the management platform A may be the main server of the management system of the pipe network company. Through this architecture design, there may be little change to the existing system of the pipe network company. Only some changes in the interactive process may be needed to realize the change of the management system of the pipe network company. Compared with the existing management system of pipe network company, the main change may be that the management system of pipe network company may have become a data requester, which may obtain the required relevant data by sending a request to the service information server. When a settlement object of the management system of the pipe network company is the department of volume measurement, such as gas users, volume measurement data (also known as volume data) may be requested. While when the settlement object of the management system of the pipe network company is the department of energy measurement, such as international gas supply institutions, energy measurement data (also known as energy data) may be requested. When necessary, the management system of the pipe network company may also convert energy metering and volume measurement data.

In order to further explain the working process of this embodiment, the management platform A may be predetermined with a first request instruction matching the first data and a second request instruction matching the second data. When a request type of the user platform A matches the first request instruction, the management platform A may request the first data by the sense control platform A. When the request type of the user platform A matches the second request instruction, the management platform A may request the second data by the sense control platform A.

During the implementation of this embodiment, in order to further improve the work efficiency of the management system of the pipe network company, the first request instruction and the second request instruction may be directly built in the central server of the management system of the pipe network company, which may correspond to the first data and the second data respectively. The corresponding relationship between the two may be obtained through SVM classifier learning or deep learning. For example, if a user platform A sends a data request from an international gas supply organization, the binary classifier generated by SVM may recognize its request as the first request instruction according to its own attributes. At this time, the management platform A may request the first data through the sense control platform A. Similarly, if a domestic gas supply organization sends a data request, the data request may also be recognized as a second request instruction. At this time, the management platform A may request the second data through the sense control platform A. The design mode of the present disclosure may be very suitable for the transition between volume metering and energy metering transformation. Because there may be different metering modes of different gas supply mechanisms and different metering modes of gas consumption terminals in different regions, it may be only necessary to set the classification, and the volume metering or capacity metering data may be transmitted quickly in a short period of time.

In order to further illustrate a working process of this embodiment, the natural gas energy metering terminal may comprise a user platform B, a service platform B, a management platform B, a sense network platform B, and a sense control platform B that interact in turn. The sense control platform B may include a chromatographic sensor for obtaining chromatographic data of the natural gas sample, an ultrasonic sensor for obtaining volumetric data of the natural gas sample, and a related sensor for obtaining related data of energy measurement of the natural gas sample. The related data of energy measurement of the natural gas sample may include natural gas temperature, natural gas pressure, natural gas content, natural gas flow, natural gas compression factor, natural gas density, or natural gas heat generation. The sense control platform B may transmit the chromatographic data, the volume data, and the related data to the management platform B by the sense network platform B. The management platform B may obtain the first natural gas energy data (also known as the first energy data) according to the chromatographic data, the volume data and the related data, and send the chromatographic data, the volume data, the related data and the first natural gas energy data to the user platform B through the service platform B. The user platform B may transmit the chromatographic data, the volume data, the related data, and the first natural gas energy data as the natural gas metering data to the energy metering management system through the sense network platform.

During the implementation of this embodiment, considering the popularity of smart gas meters, in the present disclosure, a method of energy data calculation at the natural gas energy metering terminal may be adopted. This method may be similar to edge computing technology, which apportions a huge amount of calculation to each edge terminal, so as to improve the operation efficiency of the overall system.

In order to further explain the working process of this embodiment, the energy metering management system may obtain the second energy data of natural gas (also known as the second energy data) according to the received chromatographic data, the volume data, and the related data. The energy metering management system may perform data proofreading (also known as data comparison) according to the second energy data natural gas and the first energy data of natural gas, and send abnormal data results with abnormal proofreading results to the natural gas energy metering terminal through the sense network platform. The natural gas energy metering terminal may check the abnormal device on the natural gas energy measuring terminal based on the abnormal data result.

During the implementation of the embodiment, in order to improve the fault tolerance in energy metering of the invention, the data may be corrected through the comparison between the second energy data of natural gas and the first energy data of natural gas. If the data difference is large, the abnormal device may be issued to provide reference for device operation and maintenance.

In order to further explain the working process of this embodiment, the energy metering management system may obtain the abnormal data in a predetermined cycle, and may obtain the abnormal data in the area corresponding to the abnormal data in a predetermined cycle. The energy meter management system may transmit the abnormal data through the service information server to the management system. The pipe network company management system may perform pipe network maintenance in accordance with the abnormal data to match the abnormal data.

During the implementation of this embodiment, the abnormal area may be determined through the abnormal data, and then the pipe network company management system may further screen the abnormality and repair the pipe network.

In order to further illustrate the working process of this embodiment, the management platform B may adopt a programmable controller integrated into the natural gas energy metering terminal.

When the embodiment is implemented, the programmable controller may use various controllers, such PLC, CPLD, FPGA.

The embodiments described above further detail the purpose, technical scheme and beneficial effects of the invention. It should be understood that the above are only the embodiments of the invention and may not be used to limit the scope of the present disclosure. Any modification, equivalent replacement, improvement made within the spirit and principles of the present disclosure shall be included in the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, the system components may be implemented by hardware, also may be implemented merely by software, such as installing the system on existing servers or mobile devices.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in claim. Rather, claim subject matter lies in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should consider specified significant digits and adopt ordinary rounding techniques. Notwithstanding that the numerical ranges and parameters configured to illustrate the broad scope of some embodiments of the present disclosure are approximations, the numerical values in specific examples may be as accurate as possible within a practical scope.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A method for determining an abnormal device in a process of measuring energy of natural gas based on Internet of Things (IoT), wherein the method is performed by a management platform, comprising:
   in response to a query request received by a user platform, obtaining a natural gas detection parameter detected by at least one detection device of a sense control platform via a sense network platform;
   determining first energy data and second energy data by processing the natural gas detection parameter;
   determining whether the abnormal device exists by comparing the first energy data and the second energy data;
   in response to determining that the abnormal device exists, for each detection device of the at least one detection device for detecting the natural gas detection parameter, determining a probability that the detection device is abnormal based on related information of the detection device, the first energy data, and the second energy data; and determining the abnormal device based on the probability that the detection device is abnormal.

2. The method of claim 1, wherein the sense control platform includes at least one first detection device at a pipe network end, the natural gas detection parameter includes at least one first detection parameter detected by the at least one first detection device, and the determining the first energy data by processing the natural gas detection parameter includes:

determining the first energy data by processing the at least one first detection parameter based on a predetermined algorithm.

3. The method of claim 2, wherein the sense control platform includes at least one second detection device at a user end, the natural gas detection parameter includes at least one second detection parameter detected by the at least one second detection device, and the determining the second energy data by processing the natural gas detection parameter includes:

determining the second energy data by processing the at least one second detection parameter based on a prediction model, wherein the prediction model is a machine learning model.

4. The method of claim 3, wherein the at least one second detection parameter includes natural gas temperature, natural gas pressure, natural gas components, and natural gas density, and the determining the second energy data by processing the at least one second detection parameter based on the prediction model includes:

determining the second energy data by processing at least one of the natural gas temperature, the natural gas pressure, the natural gas components, or the natural gas density based on the prediction model.

5. The method of claim 1, further comprising:

generating natural gas metering data based on the first energy data and the second energy data; and transmitting the natural gas metering data to the user platform via a service platform.

6. The method of claim 5, wherein the natural gas metering data includes at least one of energy data or volume data, and the transmitting the natural gas metering data to the user platform via the service platform includes:

transmitting the at least one of the energy data or the volume data to the user platform via the service platform according to a type of the query request.

7. The method of claim 6, further comprising:

determining the volume data by processing the natural gas detection parameter based on a predetermined algorithm $V_n = V_t \times P_t/P_n \times (273.15+T_n)/(273.15+T_t) \times F_z^2$, wherein $F_z = \sqrt{Z_n/Z_t}$ and is a super compression factor, $Z_n$ is a natural gas compression factor in a standard state, $Z_t$ is a natural gas compression factor obtained by the at least one detection device, $V_n$ is a natural gas flow in the standard state, $V_t$ is a natural gas flow obtained by the at least one detection device, $P_n$ is a natural gas pressure intensity under the standard state, $P_t$ is a natural gas pressure obtained by the at least one detection device, $T_n$ is a natural gas temperature under the standard state, and $T_t$ is a natural gas temperature obtained by the at least one detection device.

8. The method of claim 6, further comprising:

determining the energy data by processing the natural gas detection parameter based on a predetermined algorithm $E = (\tilde{H}[t_1, V(t_2, p_2)] \times V_n)$, wherein E is energy generated by a complete combustion of natural gas in a standard state, $\tilde{H}[t_1, V(t_2, P_2)]$ is a real volume calorific value of natural gas, $V_n$ is a natural gas flow under the standard state, $t_1$ is a temperature of combustion reference condition, $t_2$ is a temperature of meter reference condition, $p_2$ is a pressure.

9. The method of claim 1, wherein the determining the probability that the detection device is abnormal based on related information of the detection device, the first energy data, and the second energy data includes:

determining the probability that the detection device is abnormal by processing the related information of the detection device, the first energy data, and the second energy data based on an abnormality determination model, wherein the abnormality determination model is a machine learning model.

10. A system for determining an abnormal device in a process of measuring energy of natural gas based on Internet of Things (IoT), comprising:

at least one storage device including a set of instructions; and at least one processor configured to communicate with the at least one storage device, wherein when executing the set of instructions, the at least one processor is configured to direct the system to perform operations including:

in response to a query request received by a user platform, obtaining a natural gas detection parameter detected by at least one detection device of a sense control platform via a sense network platform;

determining first energy data and second energy data by processing the natural gas detection parameter;

determining whether the abnormal device exists by comparing the first energy data and the second energy data;

in response to determining that the abnormal device exists, for each detection device of the at least one detection device for detecting the natural gas detection parameter, determining a probability that the detection device is abnormal based on related information of the detection device, the first energy data, and the second energy data; and determining the abnormal device based on the probability that the detection device is abnormal.

11. The system of claim 10, wherein the sense control platform includes at least one first detection device at a pipe network end, the natural gas detection parameter includes at least one first detection parameter detected by the at least one first detection device, and to determine the first energy data by processing the natural gas detection parameter, the at least one processor is configured to direct the system to perform operations including:

determining the first energy data by processing the at least one first detection parameter based on a predetermined algorithm.

12. The system of claim 11, wherein the sense control platform includes at least one second detection device at a user end, the natural gas detection parameter includes at least one second detection parameter detected by the at least one second detection device, and to determine the second energy data by processing the natural gas detection parameter, the at least one processor is configured to direct the system to perform operations including:

determining the second energy data by processing the at least one second detection parameter based on a prediction model, wherein the prediction model is a machine learning model.

13. The system of claim 10, wherein the at least one processor is further configured to direct the system to perform operations including:

generating natural gas metering data based on the first energy data and the second energy data; and transmitting the natural gas metering data to the user platform via a service platform.

14. The system of claim 13, wherein the natural gas metering data includes at least one of energy data or volume data, and to transmit the natural gas metering data to the user platform via the service platform, the at least one processor is configured to direct the system to perform operations including:

transmitting the at least one of the energy data or the volume data to the user platform via the service platform according to a type of the query request.

15. The system of claim 10, wherein to determining the probability that the detection device is abnormal, the at least one processor is configured to direct the system to perform operations including:

determining the probability that the detection device is abnormal by processing the related information of the detection device, the first energy data, and the second energy data based on an abnormality determination model, wherein the abnormality determination model is a machine learning model.

16. A non-transitory computer-readable medium, comprising at least one set of instructions, wherein when executed by at least one processor of a computer device, the at least one set of instructions directs the at least one processor to perform operations including:

in response to a query request received by a user platform, obtaining a natural gas detection parameter detected by at least one detection device of a sense control platform via a sense network platform;

determining first energy data and second energy data by processing the natural gas detection parameter;

determining whether an abnormal device exists by comparing the first energy data and the second energy data;

in response to determining that the abnormal device exists, for each detection device of the at least one detection device for detecting the natural gas detection parameter, determining a probability that the detection device is abnormal based on related information of the detection device, the first energy data, and the second energy data; and determining the abnormal device based on the probability that the detection device is abnormal.

17. The non-transitory computer-readable medium of claim 16, wherein the sense control platform includes at least one first detection device at a pipe network end, the natural gas detection parameter includes at least one first detection parameter detected by the at least one first detection device, and to determine the first energy data by processing the natural gas detection parameter, the at least one set of instructions directs the at least one processor to perform operations including:

determining the first energy data by processing the at least one first detection parameter based on a predetermined algorithm.

18. The non-transitory computer-readable medium of claim 17, wherein the sense control platform includes at least one second detection device at a user end, the natural gas detection parameter includes at least one second detection parameter detected by the at least one second detection device, and to determine the second energy data by processing the natural gas detection parameter, the at least one set of instructions directs the at least one processor to perform operations including:

determining the second energy data by processing the at least one second detection parameter based on a prediction model, wherein the prediction model is a machine learning model.

19. The non-transitory computer-readable medium of claim 16, wherein the at least one set of instructions further directs the at least one processor to perform operations including:

generating natural gas metering data based on the first energy data and the second energy data; and transmitting the natural gas metering data to the user platform via a service platform.

20. The non-transitory computer-readable medium of claim 19, wherein the natural gas metering data includes at least one of energy data or volume data, and to transmit the natural gas metering data to the user platform via the service platform, the at least one set of instructions directs the at least one processor to perform operations including:

transmitting the at least one of the energy data or the volume data to the user platform via the service platform according to a type of the query request.

* * * * *